May 8, 1951  C. S. ASH  2,551,783
VEHICLE WHEEL
Filed Dec. 28, 1946  3 Sheets-Sheet 1

INVENTOR
Charles S. Ash
BY
Morgan, Finnegan & Durham
ATTORNEYS

May 8, 1951　　　　　　　C. S. ASH　　　　　　2,551,783
VEHICLE WHEEL
Filed Dec. 28, 1946　　　　　　　　　　　　3 Sheets-Sheet 2
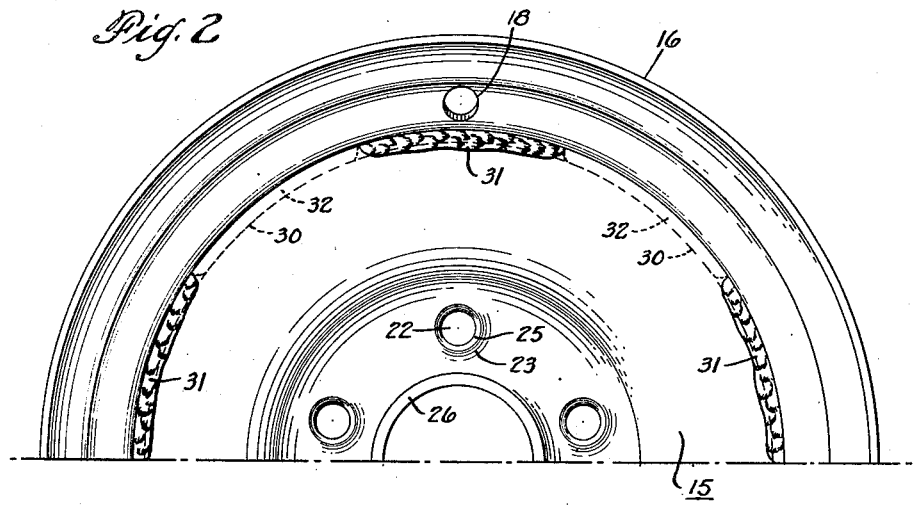
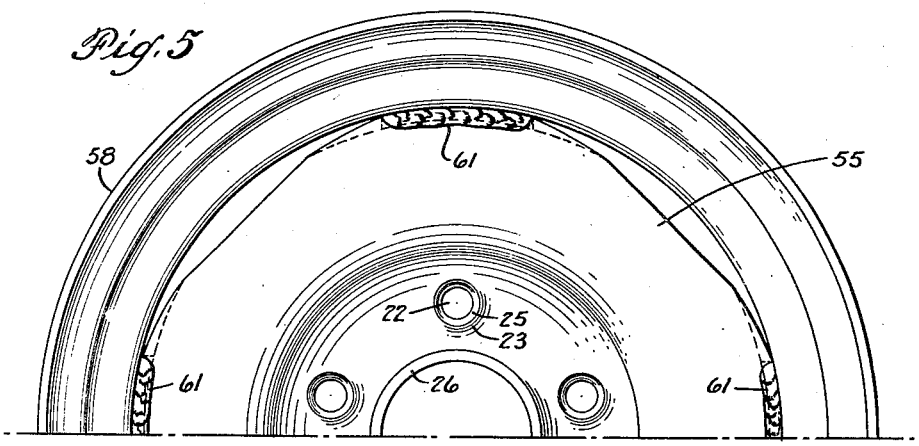
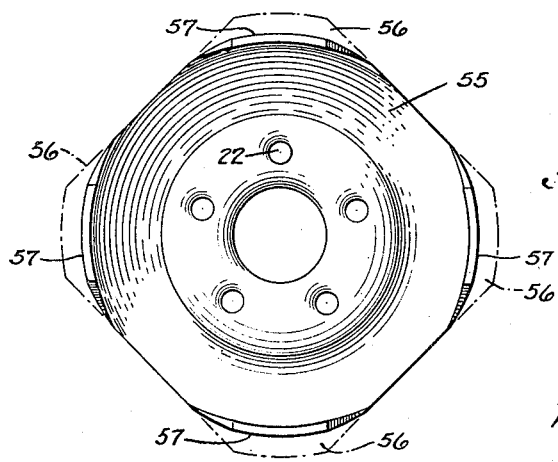
INVENTOR
*Charles S. Ash*
BY
*Morgan, Finnegan & Durham*
ATTORNEYS

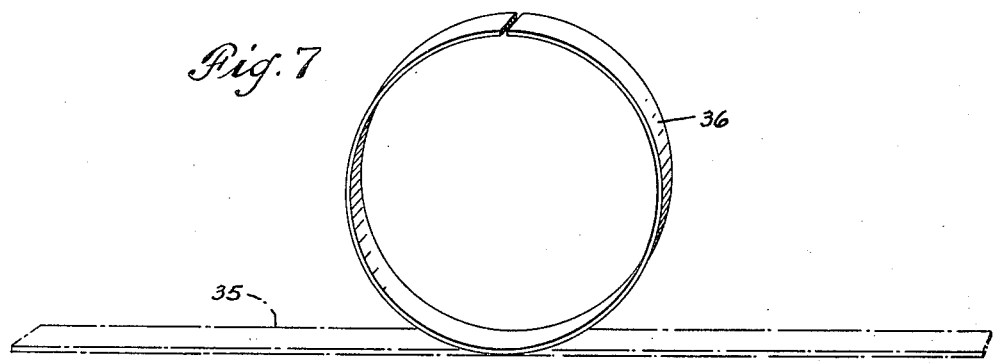
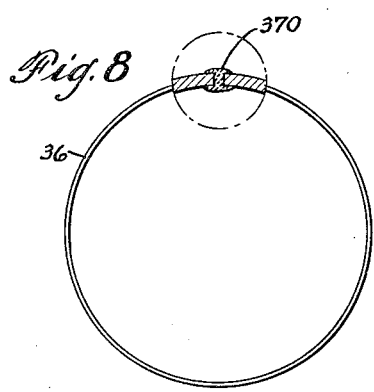
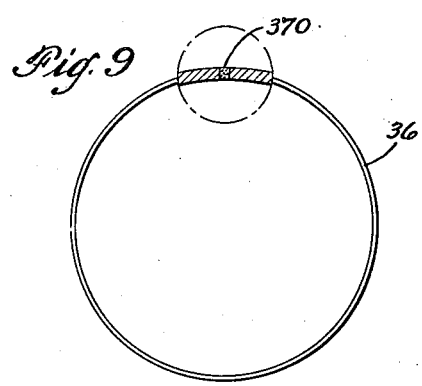
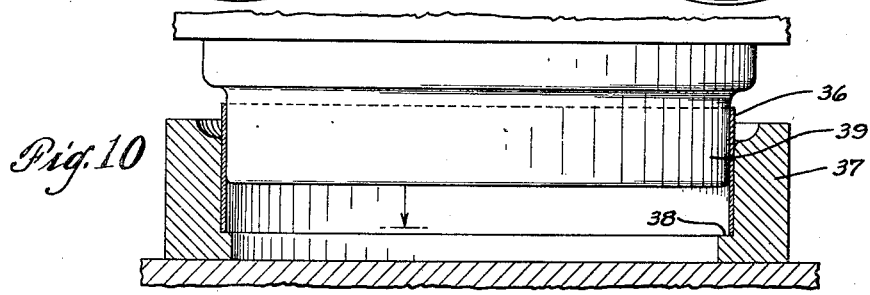
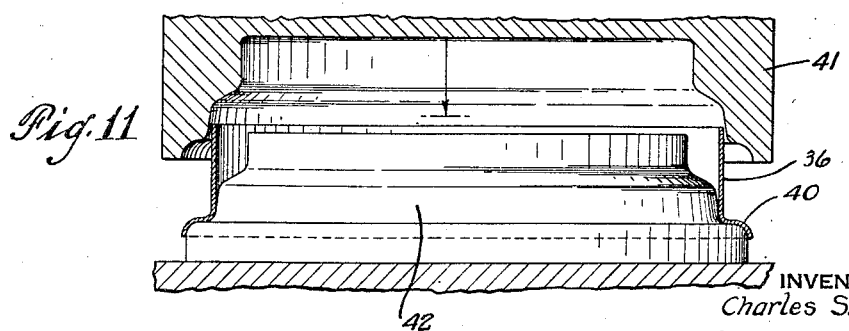

Patented May 8, 1951

2,551,783

UNITED STATES PATENT OFFICE 2,551,783

VEHICLE WHEEL

Charles S. Ash, Milford, Mich.

Application December 28, 1946, Serial No. 719,101

1 Claim. (Cl. 301—63)

The present invention relates to an improved vehicle wheel of the demountable at the hub type.

Objects and advantages of the invention will be set forth in part hereinafter and in part will be obvious herefrom, or may be learned by practice with the invention, the same being realized and attained by means of the instrumentalities, processes, steps and combinations pointed out in the appended claim.

The invention consists in the novel steps, parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 2 is a side elevation of the wheel shown in Fig. 1 above the centerline thereof viewed from the outside of the wheel;

Fig. 5 is a side elevation of the wheel shown in Fig. 4 viewed from the outside of the wheel;

Fig. 6 is a side elevation of the web of the wheel shown in Figs. 4 and 5 viewed from the inside of the web; and Figs. 7, 8, 9, 10 and 11 are views of a rim segment in various stages of fabrication in accordance with the method of the present invention.

It is an object of the present invention to provide an improved vehicle wheel of the demountable at the hub type which is particularly adaptable for light vehicle use such as, for instance, passenger cars and light farm vehicles, and to provide a method for fabricating such wheels. Another object is the provision of an economical demountable at the hub type of vehicle wheel with a drop center type of rim which is of strong and well balanced construction. The invention further provides a method of mass producing wheels of the characteristics mentioned which is relatively simple and economical and requires the use of relatively inexpensive, common and plentiful tools, whereas other wheels of comparable types require in their fabrication the use of complicated and expensive machinery.

Figure 1:
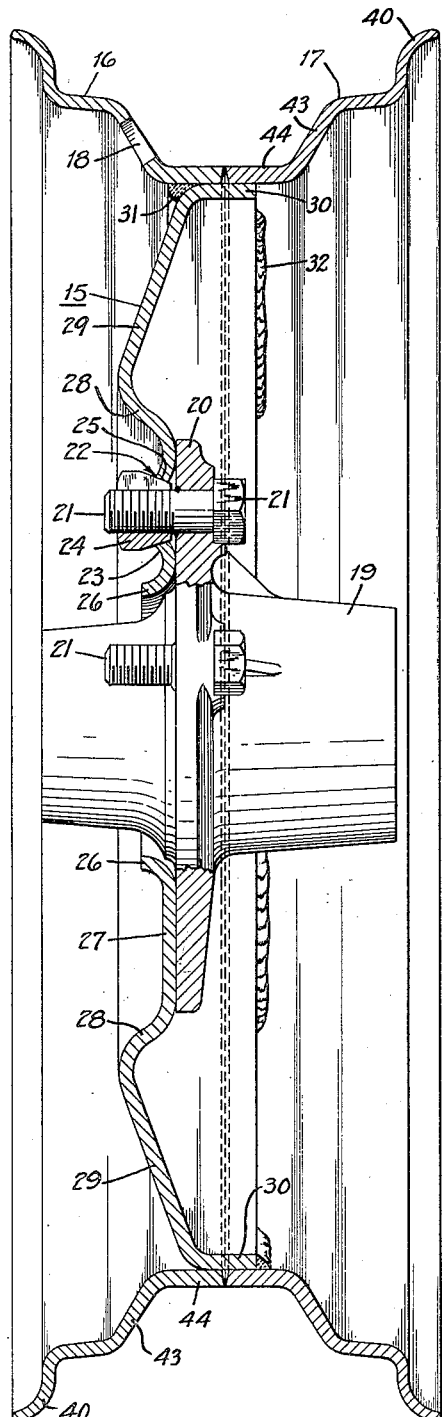
Fig. 1 is a cross-sectional view of a vehicle wheel embodying the present invention and made in accordance with the method thereof.

Referring now in detail to the illustrative embodiments of the invention and the method thereof shown by way of example in the accompanying drawings, and referring first to the embodiment of Figs. 1 and 2, it will be seen that the vehicle wheel is of three piece construction comprising the web 15 and the drop center rim halves 16 and 17 which are preferably duplicates of each other except that an aperture 18 is provided in the outer half 16 to receive an inner tube valve stem. The wheel is adapted to be mounted at the hub upon a hub member 19 which may be any one of a number of different conventional present day hubs or similar thereto. The hub is provided with a flange 20 having mounting bolts 21 to be received through apertures 22 in the curved mounting bosses 23 of the web, and frusto-conical nuts 24 may be used for demountably mounting the wheel, the apertures 22 being provided with suitably inclined defining walls 25 to cooperate with the nuts.

As shown the web 15 is strongly formed having an inner peripheral turned portion 26 merging into a plane except for bosses 23 bolting on portion 27, which terminates in a reversely curved central web portion 28. From the portion 28 the web extends in a generally frusto-conically shaped portion 29 which terminates at the outer periphery of the web in an integral, axially inwardly turned, substantially cylindrical portion 30. The rim halves 16 and 17 abut at approximately the center of cylindrical portion 30, and are welded to the web by arcuate lines of welding 31 and 32 on the outside and inside respectively of the wheel, said welding being arranged in staggered relationship circumferentially of the wheel as shown.

Referring now to the method of the present invention utilized in the fabrication of the wheel just described, the web 15 is stamped or pressed out of a blank of suitable metal, and the tapered mounting apertures 22 are drawn and coined. These operations may be carried out with machine tools of general use and application which are relatively plentiful and reasonable to buy.

The fabrication of the drop center rim segments or halves 16 and 17 is shown in Figs. 7 to 11 of the drawings. As shown in Fig. 7, a blank of metal 35 represented in dotted lines in its original plane condition is first rolled into the form of a loop or ring 36, and this may be accomplished with a simple band coiling roll. The ends of the ring 36 are next butt welded together as shown in Fig. 8 of the drawings with a weld designated 37a, and the flash of the weld is then removed in any suitable way, leaving a smooth workable ring 36 as illustrated in Fig. 9 of the drawings.

Thereafter a heavy press is utilized in the formation of the rim halves and, as shown in Fig. 10 of the drawings, the ring 36 is positioned in the female ring die 37 with its edge against shoulder 38 and the male ring die 39 cooperates therewith to form the tire flange 40 (Fig. 11) of the rim half. The ring 36, so formed, is then positioned between other cooperatingly formed ring dies 41 and 42 and pressed to provide the frusto-conical wall 43 and cylindrical wall 44 (Fig. 1) completing the drop center formation of the rim half 16 or 17. An aperture 18 may at this time be conveniently provided in the rim half if it is to become an outer half 16.

The dimensions of the various dies used in the pressing operations forming the web 15 and the rim halves 16 and 17 are so chosen that the rim halves will be a tight press fit on the external surface of the cylindrical portion 30 of the web. The rim halves are thus press fitted upon the web with their edges abutting centrally of portion 30, and the welding 31 and 32 is made in the positions already described and as shown.

In the formation of the wheel described it will be noted that the entire fabrication has been effected by a simple rolling operation and upon ordinary presses, and that no highly specialized drop center rim rolling or other equipment has been required. No riveting or machine work has been necessary, and the wheel has been economically formed on usual tools of the three parts 15, 16 and 17.

In the formation of the rim as described it will be noted that the flange 40 of the rim half was expanded or stretched from the ring 36, and that the portions 43 and 44 were formed by compacting or reducing the ring 36 in the pressing operations. Proportional strength as required is thus provided in the finished rim halves and in the finished rim, the radially outer portions being thinner while the radially inner portions are denser, thicker and stronger.

It will be understood that variations in the pressing steps outlined may be followed within the scope of the present invention. If the metal used for the rim halves 16 and 17 is relatively soft and malleable it is possible to combine the pressing operations shown in Figs. 10 and 11 of the drawings, having a single pressing operation with the use of suitably formed ring dies, as will be understood by those skilled in the art. Also, in the use of such a procedure, it might be found desirable to press the ring or loop 36 into the shape of a frustum of a right circular cone, and thereafter by pressing operation form the rim halves 16 and 17.

Figure 3:
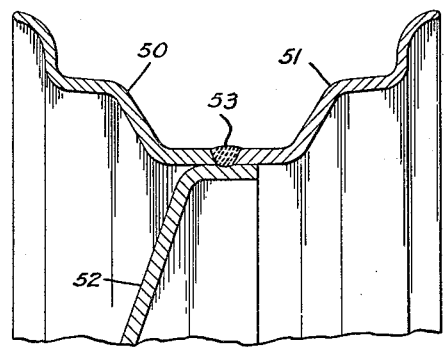
Fig. 3 is a fragmentary cross-sectional view of a modified embodiment of the invention.

Fig. 3 of the drawings illustrates a modified embodiment of the invention in which the rim halves 50 and 51 are press fitted on the cylindrical outer periphery of a web 52 but their adjacent edges are brought into a spaced relationship. A circular weld 53 is then made whereby the web and rim halves are securely joined by the single weld. The rim halves and web are formed in accordance with the method already described.

Figure 4:
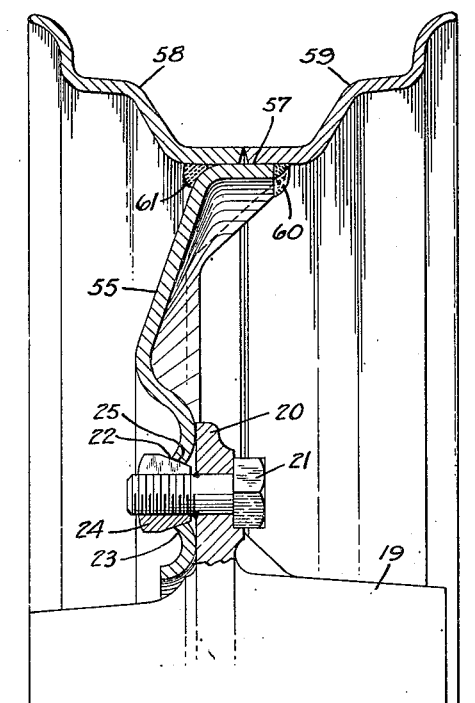
Fig. 4 is a cross-sectional view above the centerline of another modified embodiment of the present invention.

Another embodiment of the invention is disclosed in Figs. 4, 5 and 6 of the drawings and is likewise fabricated in accordance with the method described. The web 55 is formed of the generally rectangular blank shown in Fig. 6 of the drawings, the corners 56 thereof shown in dotted lines in the drawings being inwardly turned in the pressing operation thereon to provide a plurality of outer surfaces 57 upon which the rim halves 58 and 59 are press fitted into abutting relationship and welded by means of inner and outer welds 60 and 61 respectively. As clearly shown in Fig. 5, the web 55 does not engage the rim formation intermediate the turned corners 56, which provides a somewhat spoke-like formation for the wheel. There is thus saved a substantial amount of material in making the web portion of the wheel, as the web blank may be substantially smaller than would be the case if a full engagement of web and rim were used. The finished wheel, however, is of strong and durable construction.

The invention in its broader aspects is not limited to the specific mechanisms, process and steps shown and described but departures may be made therefrom, within the scope of the accompanying claim, without departing from the principles of the invention and without sacrificing its chief advantages.

What I claim is:

A vehicle wheel comprising, in combination, a pressed curved web member having an integral cylindrical outer peripheral portion and a rim for said web of the drop center type, said rim comprising a pair of individual, annular, duplicate, pressed rim halves seated on said cylindrical portion and welded thereto by arcuate lines of welding, said lines for the respective ones of said halves being circumferentially offset with respect to each other.

CHARLES S. ASH.

REFERENCES CITED

The following references are of record in the file of this patent:

UNITED STATES PATENTS

| Number | Name | Date |
| --- | --- | --- |
| 419,488 | Arnold et al. | Jan. 14, 1890 |
| 1,602,630 | White | Oct. 12, 1926 |
| 1,912,594 | Sauzedde | June 6, 1933 |
| 2,083,229 | Horn et al. | June 8, 1934 |
| 2,038,211 | Frank | Apr. 21, 1936 |
| 2,068,947 | Frank | Jan. 26, 1937 |
| 2,090,254 | Eksergian | Aug. 17, 1937 |
| 2,231,183 | Flandes | Feb. 11, 1941 |
| 2,247,002 | Rendleman | June 24, 1941 |
| 2,397,719 | Ash | Apr. 2, 1946 |